(12) United States Patent
Kim et al.

(10) Patent No.: US 12,705,159 B2
(45) Date of Patent: Aug. 11, 2026

(54) NEURAL NETWORK COMPUTING SYSTEM AND METHOD OF EXECUTING NEURAL NETWORK MODEL

(71) Applicant: SAMSUNG ELECTRONICS CO., LTD., Suwon-si (KR)

(72) Inventors: Jungho Kim, Suwon-si (KR); Hyunjin Kim, Suwon-si (KR); Youngchan Cho, Suwon-si (KR); Hoon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 605 days.

(21) Appl. No.: 18/112,769

(22) Filed: Feb. 22, 2023

(65) Prior Publication Data

US 2024/0004774 A1 Jan. 4, 2024

(30) Foreign Application Priority Data

Jul. 1, 2022 (KR) ........................ 10-2022-0081422

(51) Int. Cl.
*G06F 9/34* (2018.01)
*G06F 11/34* (2006.01)
*G06N 3/10* (2006.01)

(52) U.S. Cl.
CPC ........... *G06F 11/3442* (2013.01); *G06N 3/10* (2013.01)

(58) Field of Classification Search
CPC ........... G06F 11/3442; G06F 2209/483; G06F 1/324; G06F 9/4887; G06F 9/5066;
(Continued)

(56) References Cited

U.S. PATENT DOCUMENTS 10,747,292 B2 8/2020 Liu et al.
11,119,549 B2 9/2021 Sadowski
(Continued)

FOREIGN PATENT DOCUMENTS

KR 10-2105681 B1 4/2020
KR 10-2271469 B1 6/2021
KR 10-2023-0124248 A 8/2023

OTHER PUBLICATIONS

Mikhail Melnik et al., “Workflow scheduling using Neural Networks and Reinforcement Learning”, Procedia Computer Science, vol. 156, 2019, pp. 29-36, DOI: 10.1016/j.procs.2019.08.126, XP085840496.

(Continued)

*Primary Examiner* — Dong U Kim
(74) *Attorney, Agent, or Firm* — Sughrue Mion, PLLC

(57) ABSTRACT

A neural network computing system includes a processor including heterogeneous computing devices configured to execute a neural network model; a memory configured to buffer input data and output data of the neural network model; a memory controller configured to control data input and data output of the memory; and a system bus configured to support communication between the processor and the memory controller. The processor determines a target execution time for each node included in the neural network model based on a target end-to-end execution time of the neural network model; controls operating frequencies of hardware devices including the heterogeneous computing devices, the memory controller, and the system bus based on a target computing device for execution of each node, an amount of work for each node, and the target execution time for each node, and executes the neural network model by operating at the operating frequencies.

20 Claims, 13 Drawing Sheets

(58) Field of Classification Search
CPC ........ G06F 9/5094; G06N 3/10; G06N 3/063; G06N 3/045; Y02D 10/00
See application file for complete search history.

(56) References Cited

U.S. PATENT DOCUMENTS

| | | | | |
|---|---|---|---|---|
| 11,294,747 | B2 | 4/2022 | Kegel et al. | |
| 2010/0058086 | A1* | 3/2010 | Lee | G06F 1/3203 713/322 |
| 2016/0116956 | A1 | 4/2016 | Kim et al. | |
| 2019/0370086 | A1* | 12/2019 | Heilper | G06N 3/063 |
| 2020/0250539 | A1* | 8/2020 | Liu | G06N 3/044 |
| 2020/0409757 | A1* | 12/2020 | Mcbride | G06F 9/5038 |
| 2021/0064444 | A1 | 3/2021 | Rao et al. | |
| 2021/0165477 | A1 | 6/2021 | Ding et al. | |
| 2021/0174184 | A1 | 6/2021 | Shan et al. | |
| 2022/0109742 | A1* | 4/2022 | Kumar | H04L 41/5019 |
| 2022/0391665 | A1* | 12/2022 | Zhang | G06N 3/063 |
| 2022/0391678 | A1* | 12/2022 | Zhang | G06N 3/04 |
| 2023/0266815 | A1 | 8/2023 | Kim et al. | |
| 2024/0394168 | A1* | 11/2024 | Kato | G06F 11/36 |
| 2025/0053806 | A1* | 2/2025 | Shibata | G06N 3/04 |

OTHER PUBLICATIONS

Di Liu, "Latency, Energy, and Schedulability of Real-Time Embedded Systems", Leiden University Scholarly Publications, 2017, 157 pages, ISBN 978-94-6299-658-8, XP093099216.

Communication issued on Nov. 17, 2023 by the European Patent Office for European Patent Application No. 23174078.8.

* cited by examiner

NEURAL NETWORK COMPUTING SYSTEM AND METHOD OF EXECUTING NEURAL NETWORK MODEL

CROSS-REFERENCE TO RELATED APPLICATION

This application is based on and claims benefit of priority to Korean Patent Application No. 10-2022-0081422, filed on Jul. 1, 2022, in the Korean Intellectual Property Office, the disclosure of which is incorporated herein by reference in its entirety.

BACKGROUND

Example embodiments of the present disclosure relate to a neural network computing system and a method of executing a neural network model.

Recently, research into a neural network simulating the learning ability of the human brain to process information has been actively conducted. Using a neural network-based operation, an object or specific information may be accurately recognized and discriminated from various pieces of user data such as voices, images, and videos.

A processor may include heterogeneous computing devices. The heterogeneous computing devices may include a central processing unit (CPU) having high versatility, a neural processing unit (NPU) optimized for neural network computation, and the like. To perform neural network computation, computing devices such as an NPU and also a CPU may be used together. When a neural network computation is performed using various hardware devices including heterogeneous computing devices, however, power consumption may increase.

SUMMARY

An example embodiment of the present disclosure is to provide a neural network computing system and a method of executing a neural network model which may allow the neural network model to execute within a target runtime and may reduce power consumption of hardware devices.

According to embodiments of the present disclosure, a neural network computing system is provided. The neural network computing system includes: a processor including heterogeneous computing devices configured to execute a neural network model; a memory configured to buffer input data and output data of the neural network model; a memory controller configured to control data input and data output of the memory; and a system bus configured to support communication between the processor and the memory controller. The processor is configured to: determine a target execution time for each node among a plurality of nodes comprised in the neural network model based on a target end-to-end execution time of the neural network model; control operating frequencies of hardware devices, including the heterogeneous computing devices, the memory controller, and the system bus, based on a target computing device for execution of each node, an amount of work for each node, and the target execution time for each node; and execute the neural network model by operating at the controlled operating frequencies.

According to embodiments of the present disclosure, a neural network computing system is provided. The neural network computing system includes: a processor including heterogeneous computing devices that are configured to execute a neural network model; a memory configured to buffer input data and output data of the neural network model; a memory controller configured to control data input and data output of the memory; and a system bus configured to support communication between the processor and the memory controller. The processor includes: a feedforward control portion configured to determine operating frequencies of hardware devices, including the heterogeneous computing devices, the memory, and the memory controller, based on an input of a target end-to-end execution time of the neural network model and an input of static analysis data independent of a result of execution of the neural network model; a neural network model execution portion configured to control the hardware devices according to the determined operating frequencies, execute the neural network model, and output an actual end-to-end execution time of the neural network model; and a feedback control portion configured to adjust the operating frequencies of the hardware devices based on dynamic analysis data dependent on the result of the execution of the neural network model, including the actual end-to-end execution time.

According to embodiments of the present disclosure, a method of executing a neural network model is provided. The method includes: estimating an amount of work for each node among a plurality of nodes included in the neural network model based on execution of the neural network model being triggered; determining a target execution time for each node of the plurality of nodes based on a target end-to-end execution time of the neural network model; controlling an operating frequency of each of a plurality of heterogeneous computing devices for executing the neural network model, based on a target computing device for each node, the amount of work for each node, and the target execution time for each node; executing the neural network model using the plurality of heterogeneous computing devices operating according to the controlled operating frequency of each of the plurality of heterogeneous computing devices; and adjusting the operating frequency of each of the plurality of heterogeneous computing devices for executing the neural network model based on an actual end-to-end execution time of the neural network model.

BRIEF DESCRIPTION OF DRAWINGS

The above and other aspects, features, and advantages of embodiments of the present disclosure will be more clearly understood from the following detailed description, taken in combination with the accompanying drawings, in which.

DETAILED DESCRIPTION

Hereinafter, non-limiting example embodiments of the present disclosure will be described as follows with reference to the accompanying drawings.

Figure 1:
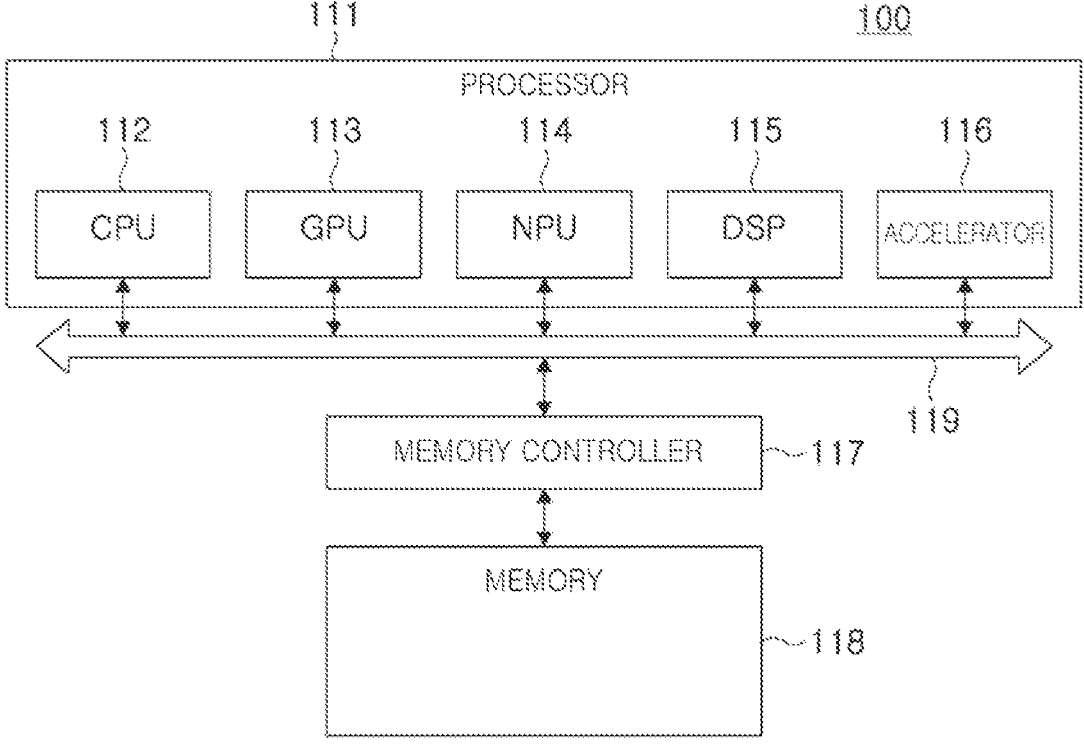
FIG. 1 is a block diagram illustrating a neural network computing system according to an example embodiment of the present disclosure.

FIG. 1 is a block diagram illustrating a neural network computing system according to an example embodiment.

FIG. 1 illustrates a neural network computing system 100. The neural network computing system 100 may execute a neural network model. The neural network model may be a model of a learning method of a human brain for processing information, and may refer to a model for accurately recognizing and discriminating an object or specific information from various user data such as voices, images, and videos.

The neural network computing system 100 may be implemented as a mobile system such as a mobile phone, a smart phone, a tablet personal computer, a wearable device, a healthcare device, or an Internet of Things (IOT) device. However, the neural network computing system 100 is not necessarily limited to a mobile system, and may be implemented as a personal computer, a laptop computer, a server, a media player, or an automotive device such as a navigation device.

The neural network computing system 100 may include a plurality of hardware devices such as a processor 111, a memory controller 117, a memory 118, and a system bus 119. The system bus 119 may support communication between the processor 111, the memory controller 117, and the memory 118.

The processor 111 may perform a neural network computation using data stored in the memory 118. For example, the neural network computation may include operations of reading data and weight for each node included in the neural network model, performing a convolution computation on the data and weights, and storing or outputting a result of the computation.

The memory 118 may store data for the processor 111 to perform a neural network computation. For example, the memory 118 may be loaded with one or more neural network models which may be executed by the processor 111. Also, the memory 118 may store input data and output data of the neural network model. The memory 118 may include a volatile memory such as dynamic random access memory (DRAM), synchronous DRAM (SDRAM), static RAM (SRAM), resistive RAM (RRAM), or the like, and may include non-volatile memory such as a flash memory.

The memory controller 117 may control an operation of storing data received from the processor 111 in the memory 118 and an operation of outputting the data stored in the memory 118 to the processor 111.

The processor 111 may include heterogeneous computing devices such as a central processing unit 112 (CPU), a graphics processing unit 113 (GPU), a neural processing unit 114 (NPU), a digital signal processor 115 (DSP), and an accelerator 116.

Specifically, the CPU 112 may be configured as a highly versatile computing device. The GPU 113 may be configured as a computing device optimized for parallel operation such as graphics processing. The NPU 114 may be configured as a computing device optimized for neural network computation, and may include logical blocks for executing unit computations mainly used for neural network computation, such as convolution computation. The DSP 115 may be configured as a computing device optimized for real-time digital processing of analog signals. Also, the accelerator 116 may be configured as a computing device for swiftly performing a specific function.

When the processor 111 executes the neural network model, various hardware devices may operate together. For example, to execute the neural network model, the NPU 114 and also heterogeneous computing devices such as the CPU 112 and the GPU 113 may operate together. Also, the memory controller 117 and the system bus 119 (also referred to as a “data bus”) may operate to read input data of the neural network model and to store output data. The memory controller 117 may be embodied as various numbers of hardware, software and/or firmware structures that execute the functions described herein, according to an example embodiment.

Figure 2A:
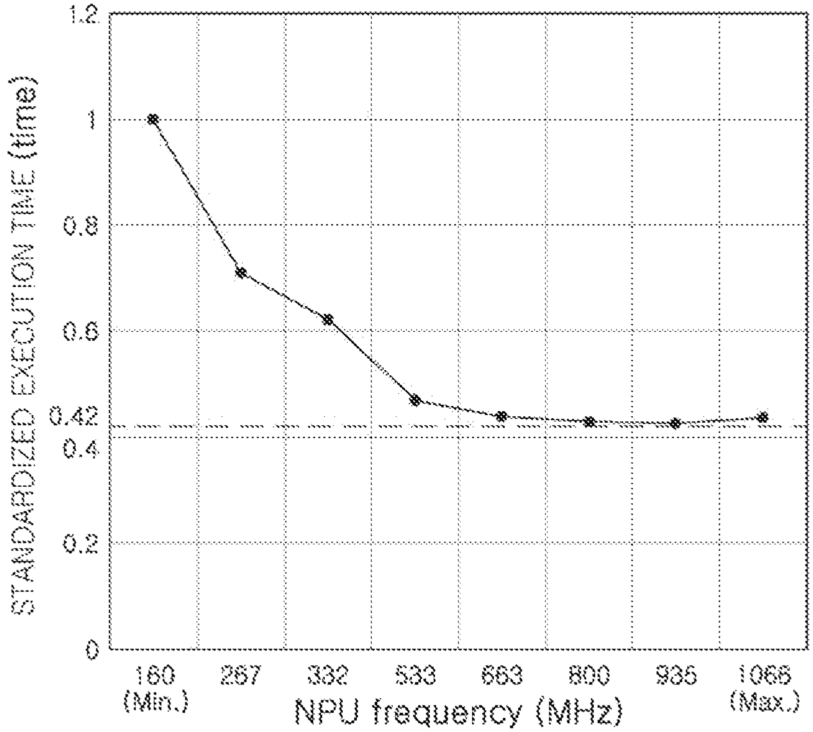
FIG. 2A is a first graph illustrating execution times of a neural network model according to operating frequencies of a neural processing unit.
Figure 2B:
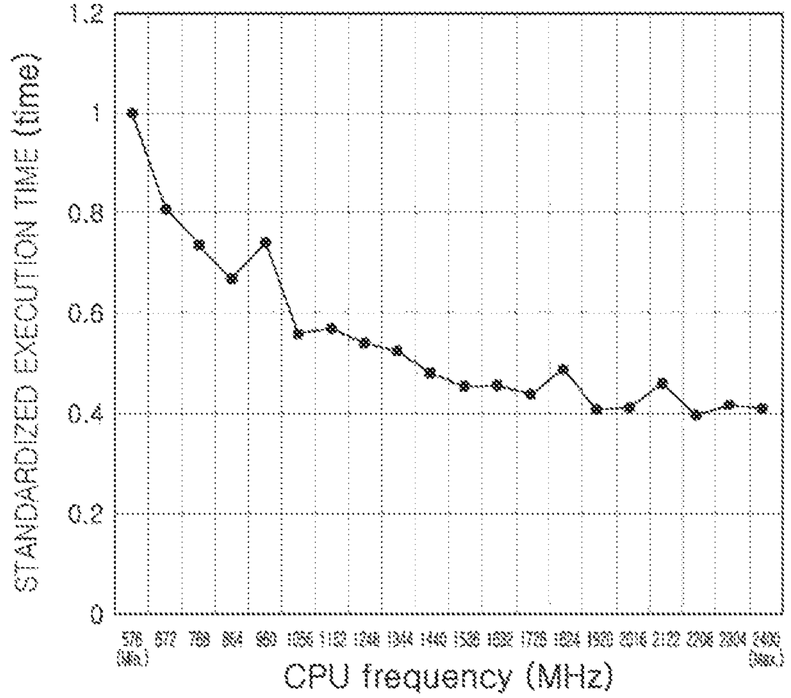
FIG. 2B is a second graph illustrating execution times of the neural network model according to operating frequencies of a central processing unit.
Figure 2C:
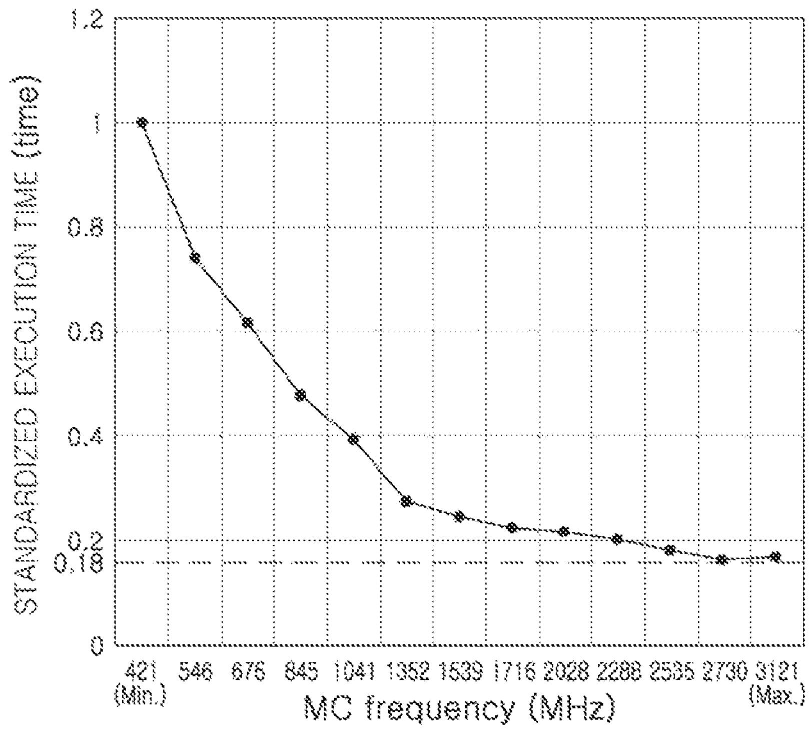
FIG. 2C is a third graph illustrating execution times of the neural network model according to operating frequencies of a memory controller.

FIGS. 2A to 2C are graphs illustrating execution times of a neural network model according to operating frequencies of hardware devices.

The graph in FIG. 2A indicates a standardized execution time of the neural network model according to an operating frequency of the NPU 114. The execution time of the neural network model may refer to a time required for the neural network model to receive data and to complete processing of the data.

The standardized execution time in FIG. 2A may refer to the standardized execution time for each operating frequency by setting the execution time required when the NPU 114 executes the neural network model by operating at the lowest operating frequency to “1”. For example, the operating frequencies of the hardware devices may be discretely adjusted according to binary code values, and a lowest operating frequency and a highest operating frequency among operating frequencies which each of the hardware devices may have may be included. In the example in FIG. 2A, the NPU 114 may have a lowest operating frequency of 160 MHz and a highest operating frequency of 1066 MHz.

Referring to the graph in FIG. 2A, as the operating frequency of the NPU 114 increases, the standardized execution time may tend to gradually decrease, and when the operating frequency of the NPU 114 is 935 MHz, the standardized execution time may decrease to a 0.42 level, which may be the shortest. In other words, the execution time of the neural network model may be affected by the operating frequency of the NPU 114.

The graph in FIG. 2B indicates the standardized execution time of the neural network model according to the operating frequency of the CPU 112. The standardized execution time in FIG. 2B may refer to a standardized execution time for each operating frequency based on the execution time of the neural network model when the CPU 112 operates at the lowest operating frequency. The graph in FIG. 2B indicates that the standardized execution time may tent to gradually decrease as the operating frequency of the CPU 112 increases, and when the operating frequency of the CPU 112 is 2208 MHz, the standardized execution time may decrease to a 0.4 level, which may be the shortest. In other words, the execution time of the neural network model may be affected by the operating frequency of the NPU 114 and also the operating frequency of the CPU 112.

The graph in FIG. 2C illustrates the standardized execution time of the neural network model according to the operating frequency of the memory controller 117. The standardized execution time in FIG. 2C may refer to a standardized execution time for each operating frequency based on the execution time of the neural network model when the memory controller 117 operates at the lowest operating frequency. The graph in FIG. 2C indicates that the standardized execution time may tend to gradually decreases as the operating frequency of the memory controller 117 increases. When the operating frequency of the memory controller 117 is 2730 MHz, the standardized execution time may decrease to a 0.18 level, which may be the shortest. In other words, the execution time of the neural network model may be greatly affected by the operating frequency of heterogeneous computing devices such as the NPU 114 and the CPU 112 and also the operating frequency of the memory controller 117.

To guarantee sensible user performance of the neural network computing system 100, a target execution time may be determined for each neural network model. For example, a target execution time of 10 ms may be determined for a neural network model for sensing an object by receiving an image frame from a camera application of the neural network computing system 100. Also, a target execution time of 15 ms may be determined for the neural network model for identifying what the object is. To execute the neural network models within the target execution time, a heterogeneous computing which may accelerate the execution of the neural network model through heterogeneous computing devices such as the NPU 114 and also the CPU 112, GPU 113, and DSP 115 may be used.

When the hardware devices simultaneously operate at a high operating frequency to execute the neural network model, power consumption may increase. To reduce the power consumption of the neural network computing system 100, a dynamic voltage frequency scaling (DVFS) mechanism for dynamically scaling an operating voltage and an operating frequency may be used. For example, a governor of the Linux kernel may predict a future usage rate based on a past usage rate for each of heterogeneous computing devices, and may determine an operating frequency based on the predicted future usage rate.

However, when the neural network computing system determines the operating frequency based on the usage rates of each of the heterogeneous computing devices without considering the target execution time of the neural network model, it may be difficult to comply with the target execution time of the neural network model. Also, when the neural network computing system uses a closed-loop control method in which an operating frequency may be determined by receiving feedback related to a past usage rate, the feedback period may reach several to several tens of milliseconds (ms). Accordingly, when the closed-loop control method is used, feedback may be received late during execution of the neural network model or after the execution of the neural network model is completed, such that it may be difficult to swiftly determine the operating frequency. Accordingly, user responsiveness, which is a property in which the neural network model may be completed within the target execution time and may provide a response to the user, may deteriorate.

In the example embodiment, the neural network computing system 100 may determine the operating frequency of each heterogeneous computing device prior to execution of the neural network model using the closed loop control and also the open loop control. Specifically, the neural network computing system 100 may comply with the target execution time of the neural network model by receiving the target execution time of the neural network model and using an open loop control for individually controlling the operating frequencies of the heterogeneous computing devices. Accordingly, user responsiveness of the neural network computing system 100 may improve.

Figure 3:
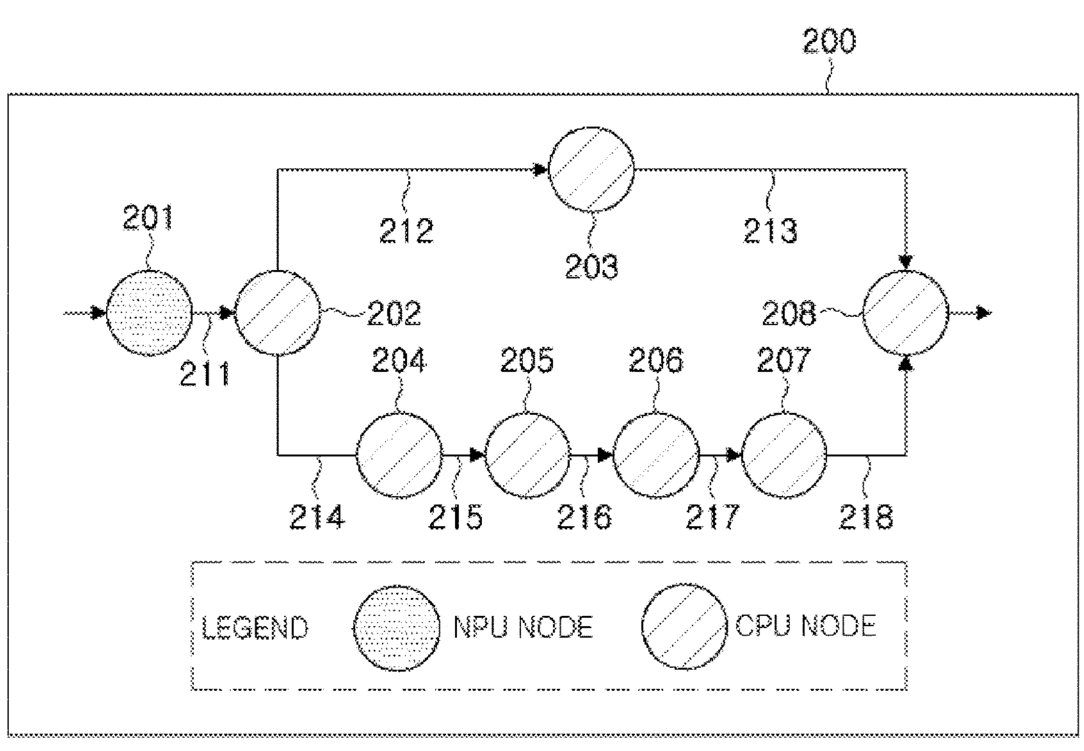
FIG. 3 is a diagram illustrating a configuration of a neural network model.

FIG. 3 is a diagram illustrating a configuration of a neural network model.

Referring to FIG. 3, a neural network model 200 may include a plurality of nodes (e.g., first to eighth nodes 201-208) and a plurality of edges (e.g., first to eighth edges 211-218). The neural network model 200 may be expressed as a directed acyclic graph. A directed acyclic graph may refer to a graph in which individual elements are oriented in a specific direction and are structured in a non-circulating structure.

Each of the plurality of nodes (e.g., first to eighth nodes 201-208) is a model of a neuron of a basic unit of the nervous system. Each of the plurality of nodes (e.g., first to eighth nodes 201-208) may include source code instructing a computation to be executed. The plurality of nodes (e.g., first to eighth nodes 201-208) may further include an attribute value indicating a target computing device on which the source code is to be executed. In the example in FIG. 3, the target computing device on which the first node 201 is to be executed may be the NPU 114, and the target computing device on which the second to eighth nodes 202-208 are to be executed may be the CPU 112.

The input and output relationship of each of the plurality of nodes (e.g., first to eighth nodes 201-208) may be represented by the plurality of edges (e.g., first to eighth edges 211-218). For example, the first edge 211 may represent a relationship in which output data of the first node 201 is input to the second node 202. Specifically, output data generated by the NPU 114 executing the first node 201 may be stored in the memory 118 through the memory controller 117. The CPU 112 may execute the second node 202 by obtaining output data stored in the memory 118 through the memory controller 117.

In an example embodiment, the neural network computing system 100 may decompose the target execution time of the neural network model and may distributes the target execution time to the nodes of the neural network model, and may control each of the operating frequencies of hardware devices including the heterogeneous computing devices based on the target execution time for each node and the target computing device for each node. The neural network computing system 100 may comply with the target execution time of the neural network model and may reduce power consumption by controlling each of the operating frequencies of the hardware devices.

Figure 4:
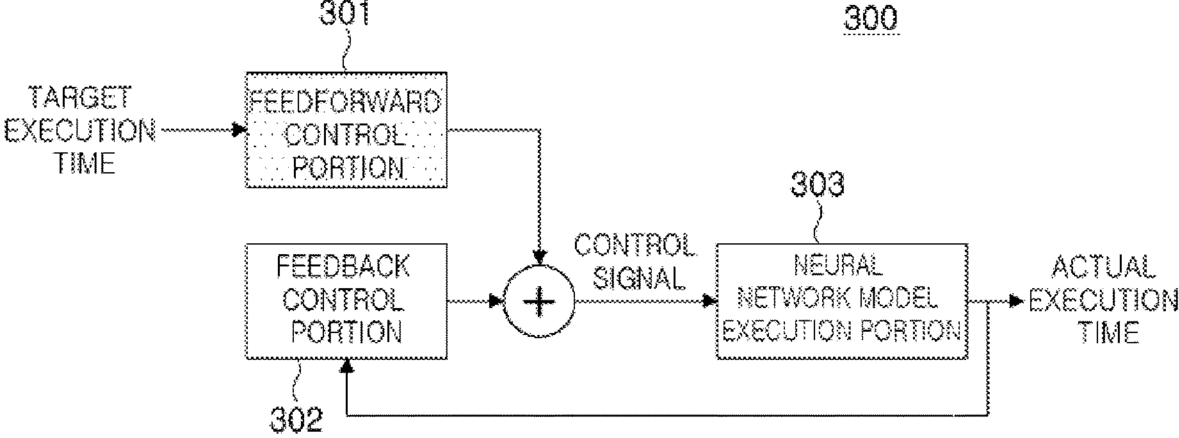
FIG. 4 is a block diagram illustrating a neural network computing system according to an example embodiment of the present disclosure.

FIG. 4 is a block diagram illustrating a neural network computing system according to an example embodiment.

Referring to FIG. 4, a neural network computing system 300 may include a feedforward control portion 301, a feedback control portion 302, and a neural network model execution portion 303. The neural network computing system 300 in FIG. 4 may correspond to the neural network computing system 100 in FIG. 1. The feedforward control portion 301, the feedback control portion 302, and the neural network model execution portion 303 may be implemented in software, and may be driven by hardware devices such as the examples described with reference to FIG. 1.

The feedforward control portion 301 may receive a target execution time of the neural network model, and may determine an operating frequency of each hardware device for executing the neural network model based on the target execution time. The feedforward control portion 301 may provide a control signal for controlling the operating frequency of each hardware device to the neural network model execution portion 303.

The feedforward control portion 301 may further receive static analysis data to determine the operating frequency of each hardware device. The static analysis data may be obtained by analyzing static data associated with nodes included in the neural network model. The static data may be independent of the result of execution of the neural network model, and may be determined before the execution of the neural network model. For example, the static data may be obtained by analyzing predetermined source code of the nodes.

The feedforward control portion 301 may control the operating frequency by generating a control signal only by inputting the target execution time of the neural network model and static analysis data without receiving feedback from the output of the neural network model execution portion 303. The control method of the feedforward control portion 301 may be referred to as an open loop control method.

The neural network model execution portion 303 may control the operating frequencies of hardware devices included in the neural network computing system 300 based on a control signal from the feedforward control portion 301, and may control the hardware devices to execute the neural network model at the operating frequency. Also, the neural network model execution portion 303 may output an actual execution time of the neural network model.

The feedback control portion 302 may receive the actual execution time feedback from the neural network model execution portion 303, and may adjust the operating frequency of each hardware device determined by the feedforward control portion 301 based on the actual execution time. The control method of the feedback control portion 302 controlling the operating frequency by receiving feedback from the neural network model execution portion 303 may be referred to as a closed loop control method.

The feedback control portion 302 may generate dynamic analysis data based on dynamic data dependent on the result of execution of the neural network model. For example, the feedback control portion 302 may analyze the usage rate of hardware resources while the neural network model is executed, and may analyze whether there is resource contention between the hardware devices. The feedback control portion 302 may use the dynamic analysis data together with the actual execution time of the neural network model to adjust the operating frequency of each hardware device.

Referring to FIG. 4, the control signal may be determined by summing the output of the feedforward control portion 301 and the output of the feedback control portion 302. That is, the operating frequencies of the hardware devices may be determined through open loop control and closed loop control.

In an example embodiment, the neural network model execution portion 303 may, by performing open-loop control using the target execution time of the neural network model, control the operating frequencies of the heterogeneous computing devices to reach the target execution time even before receiving a feedback signal. Also, the neural network model execution portion 303 may perform closed-loop control by receiving feedback on the result of execution of the neural network model performed by the neural network model execution portion 303, thereby optimizing the execution time and power consumption of the neural network model.

Figure 5:
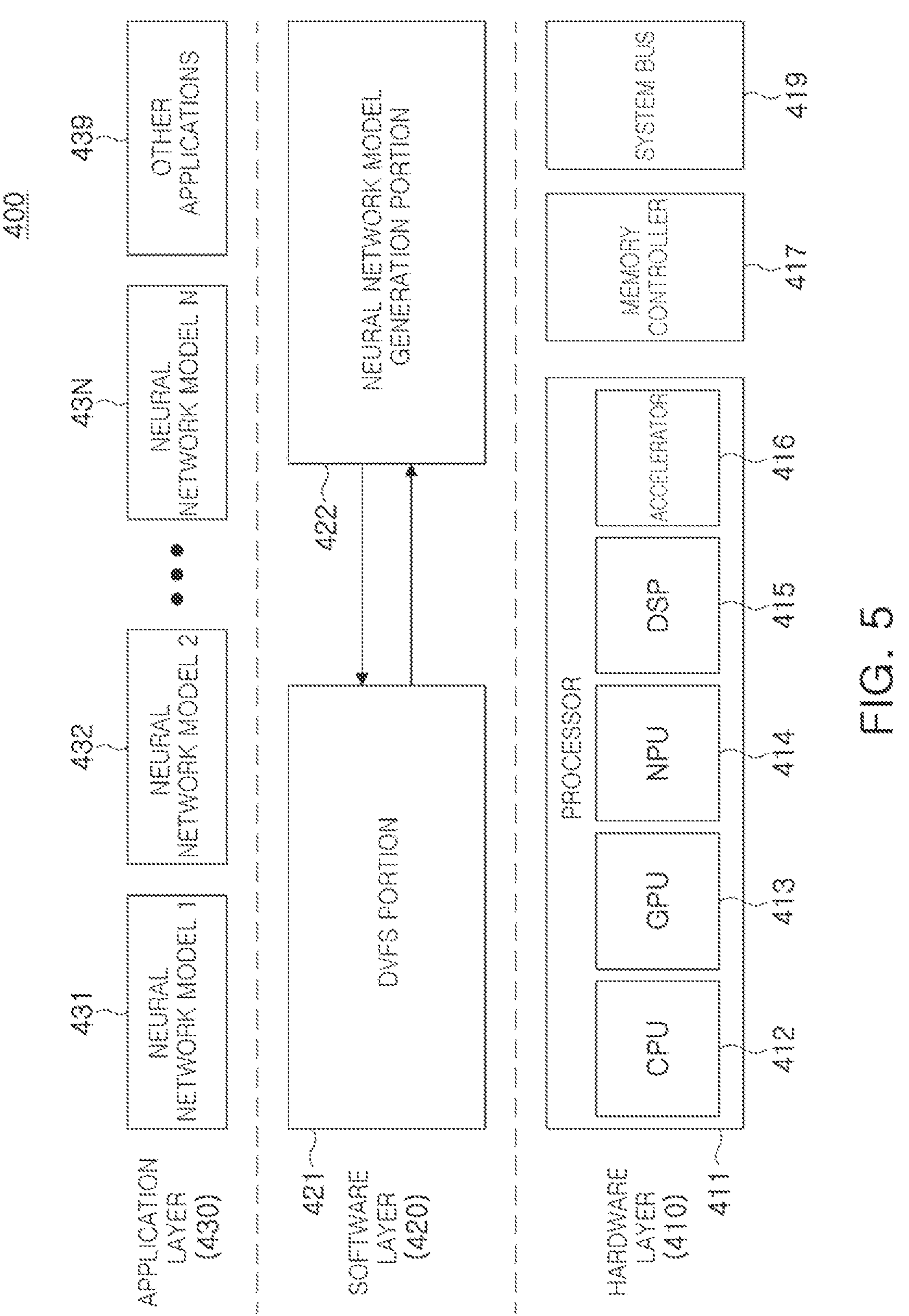
FIG. 5 is a block diagram illustrating a hierarchical structure of a neural network computing system according to an example embodiment of the present disclosure.

FIG. 5 is a block diagram illustrating a hierarchical structure of a neural network computing system according to an example embodiment.

A neural network computing system 400 may have a hierarchical structure including a hardware layer 410, a system software layer 420, and an application layer 430.

The hardware layer 410 may be the lowest layer of the neural network computing system 400, and may include hardware devices such as a processor 411, a memory controller 417, and a system bus 419. The processor 411 may include heterogeneous computing devices, such as, for example, a CPU 412, a GPU 413, an NPU 414, a DSP 415, and other accelerators 416. The hardware devices included in the hardware layer 410 in FIG. 5 may correspond to the hardware devices of the neural network computing system 100 described with reference to FIG. 1. However, a memory for inputting and outputting data under the control of the memory controller 417 may be provided in the neural network computing system 400 of FIG. 5.

The system software layer 420 may manage hardware devices of the hardware layer 410 and may provide an abstracted platform. For example, the system software layer 420 may execute a kernel such as Linux.

The system software layer 420 may include a DVFS portion 421 and a neural network model execution portion 422. In an example embodiment, the DVFS portion 421 may determine the operating frequencies of the hardware devices by executing the open loop control and the closed loop control.

Also, the neural network model execution portion 422 may execute the neural network model using hardware devices operating at the operating frequency determined by the DVFS portion 421. Also, the neural network model execution portion 422 may output the actual execution time of the neural network model as a neural network model execution result. The actual execution time may be fed back to the DVFS portion 421 for closed-loop control of the DVFS portion 421.

Meanwhile, the system software layer 420 may be driven by the processor 411. For example, the system software layer 420 may be driven by the CPU 412. However, the computing device on which the system software layer 420 may be driven is not limited to the CPU 412.

The application layer 430 may execute on the system software layer 420 and may include a plurality of neural network models 431-43N and other applications 439. For example, the other applications 439 may include a camera application. Also, the plurality of neural network models 431-43N may include a model for sensing an object included in an image frame obtained by a camera application, a model for identifying what the sensed object is, a model for sensing a target area in the image frame, a model for identifying the sensed target area, a model for classifying the identified target areas according to meanings such as people, cars, and trees, and the like. However, the types of neural network models 431-43N and other applications 439 are not limited thereto.

In an example embodiment, the system software layer 420 may control the operating frequencies of the hardware devices based on the target execution time of each of the neural network models 431-43N to execute the neural network models 431-43N.

Meanwhile, when the neural network model is executed, other applications may be simultaneously executed, or a plurality of neural network models may be simultaneously executed. For example, when the neural network computing system 400 is a mobile system, a neural network model for sensing an object may be executed simultaneously with executing a camera application. When a plurality of applications including the neural network model are simultaneously executed, resource contention between hardware devices may occur.

The system software layer 420 may adjust the operating frequencies of the hardware devices based on the actual execution time of the neural network models 431-43N and the degree of resource contention between the hardware devices by simultaneously executed applications. In an example embodiment, the neural network computing system 400 may reduce power consumption of the hardware devices and may reach a target execution time of each of the neural network models 431-43N.

Figure 6:
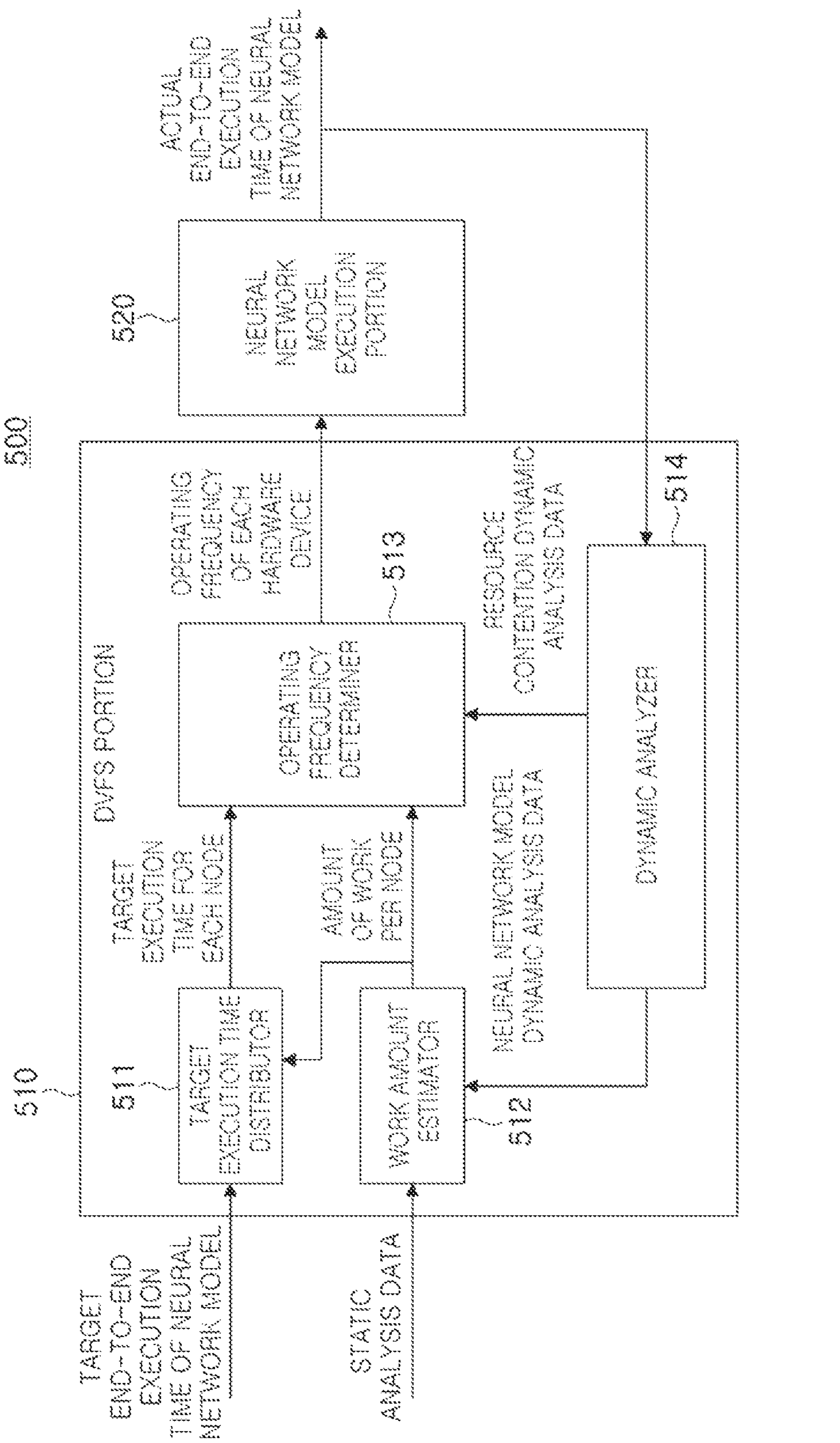
FIG. 6 is a block diagram illustrating a system software layer of a neural network computing system according to an example embodiment of the present disclosure.

FIG. 6 is a block diagram illustrating a system software layer of a neural network computing system according to an example embodiment.

Referring to FIG. 6, a system software layer 500 may include a DVFS portion 510 and a neural network model execution portion 520. The DVFS portion 510 and the neural network model execution portion 520 in FIG. 6 may correspond to the DVFS portion 421 and the neural network model execution portion 422 in FIG. 4.

Referring to FIG. 6, the DVFS portion 510 may control the neural network model execution portion 520 by performing open-loop control which may determine the operating frequency of each hardware device by receiving the target execution time and static analysis data of the neural network model from an external entity. Also, the DVFS portion 510 may receive feedback on the actual execution time of the neural network model output of the neural network model execution portion 520 and may perform closed-loop control to adjust the operating frequency of each hardware device.

The DVFS portion 510 may include a target execution time distributor 511, a work amount estimator 512, an operating frequency determiner 513, and a dynamic analyzer 514.

The target execution time distributor 511 may determine the target execution time for each node by distributing the target execution time of the neural network model to a plurality of nodes included in the neural network model. The target execution time distributor 511 may use the amount of work for each node obtained from the work amount estimator 512 to determine the target execution time for each node.

The work amount estimator 512 may estimate the amount of work for each node of the neural network model based on the static analysis data generated based on the static data of the neural network model. The estimated amount of work for each node may be input to the target execution time distributor 511. The work amount estimator 512 may further use neural network model dynamic analysis data, which is a type of dynamic analysis data generated based on the actual result of execution of the neural network model, to estimate the amount of work for each node.

The operating frequency determiner 513 may receive the target execution time for each node output by the target execution time distributor 511 and the amount of work for each node output by the work amount estimator 512, and may determine the operating frequencies of hardware devices including heterogeneous computing devices, memory controllers, and system buses. In order for the operating frequency determiner 513 to determine the operating frequencies of the hardware devices, performance of the hardware devices and the target computing device for each node may be further considered.

The DVFS portion 510 may control the operating frequencies of the hardware devices by providing an operating clock signal to the hardware devices based on the operating frequencies determined for each hardware device. The neural network model execution portion 520 may execute the neural network model using hardware devices operating at operating frequencies controlled by the DVFS portion 510. The neural network model execution portion 520 may measure and output the actual execution time of the neural network model.

The dynamic analyzer 514 may analyze a resource usage rate of the hardware devices, and may generate neural network model operation analysis data and resource contention dynamic analysis data using the actual execution time of the neural network model. The dynamic analyzer 514 may feedback the neural network model dynamic analysis data to the work amount estimator 512, and may feedback the resource contention dynamic analysis data to the operating frequency determiner 513.

FIGS. 7 to 10 are diagram illustrating software components of a neural network computing system according to an example embodiment.

Figure 7:
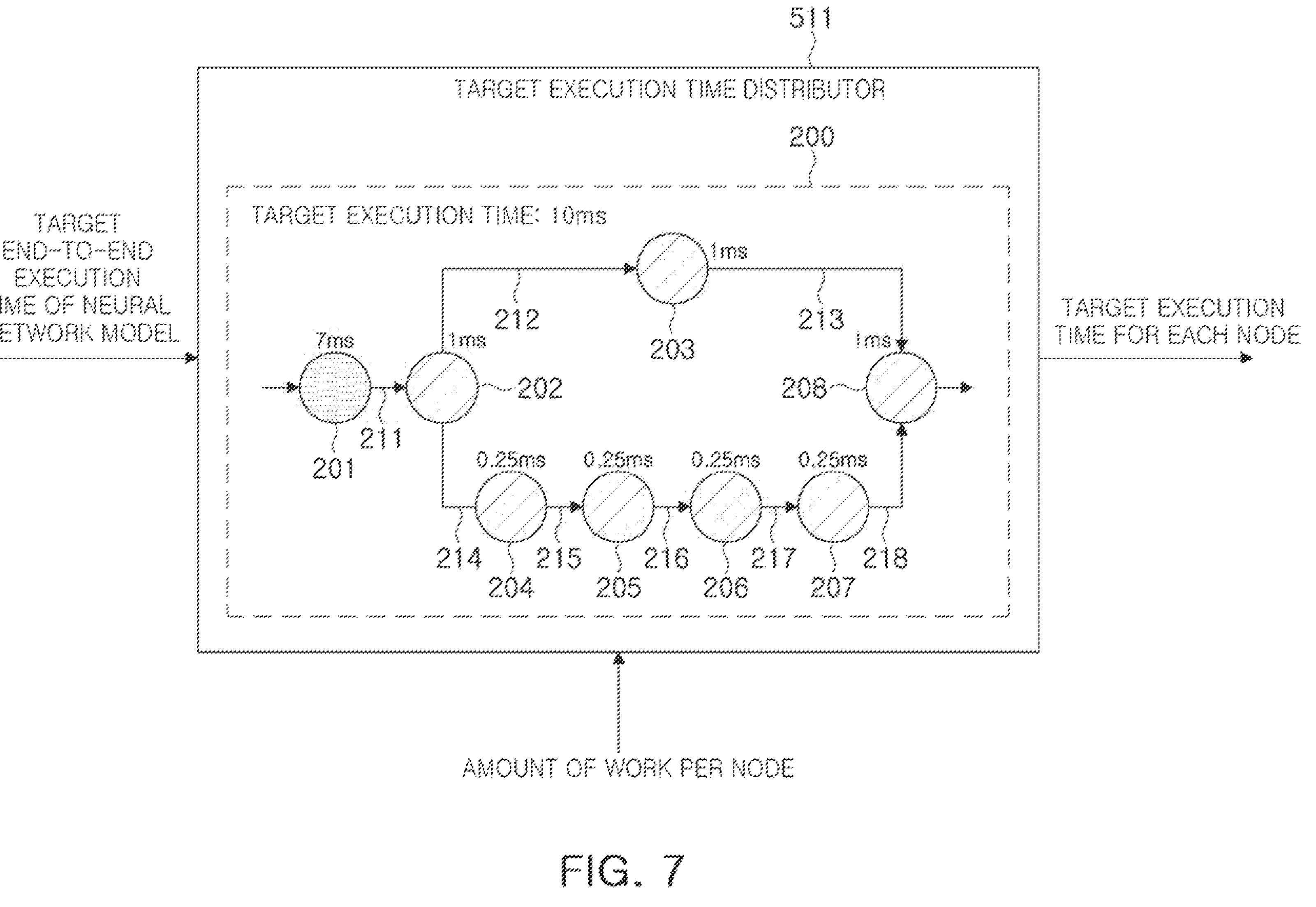
FIG. 7 is a first diagram illustrating software components of a neural network computing system according to an example embodiment of the present disclosure.

FIG. 7 is a diagram illustrating the target execution time distributor 511 described with reference to FIG. 6.

The target execution time distributor 511 may distribute the target execution time of the neural network model to a plurality of nodes based on the amount of work for each node of the neural network model. FIG. 7 illustrates the neural network model 200 described with reference to FIG. 3.

The first to eighth nodes 201-208 of the neural network model 200 represented by the directed acyclic graph may be executed in a predetermined order. For example, the second node 202 may be executed after execution of the first node 201 is completed. Also, the third node 203 may be executed after execution of the second node 202 is completed, and the fourth to seventh nodes 204-207 may be executed in sequence after execution of the second node 202 is completed. The third node 203 may be executed in parallel to the fourth to seventh nodes 204-207. Also, the eighth node 208 may be executed after execution of the third node 203 and the seventh node 207 is completed.

The execution time of the node may include the time for which data for executing the node is input from the memory to the target computing device, the data is processed, and the processed data is output from the target computing device and is stored in the memory. The execution time of the neural network model 200 may include a time from when the execution of the first node 201 of the neural network model 200 starts to when the execution of the eighth node 208 is completed. The execution time of the neural network model may be referred to as an end-to-end execution time of the neural network model.

The target end-to-end execution time of the neural network model 200 may be determined in advance. For example, a device driver which controls the hardware devices may provide an application programming interface (API) for setting a target end-to-end execution time for each neural network model. The target end-to-end execution time for each neural network model may be input through the API.

The target execution time distributor 511 may be included in the feedforward control portion 301 described with reference to FIG. 4. In the example in FIG. 7, the target execution time distributor 511 may distribute the target execution time to each of the first to eighth nodes 201-208 such that the entirety of the first to eighth nodes 201-208 may be performed within 10 ms, which is the target end-to-end execution time.

The target execution time distributor 511 may determine the execution order and whether to execute the first to eighth nodes 201-208 in parallel based on the connection relationship between the first to eighth 201-208 and the first to eighth edges 211-218, and may determine the target execution time for each node by distributing the target end-to-end execution time of the neural network model to nodes, executed in sequence, in proportion to the amount of work for each node.

The third node 203 and the fourth to seventh nodes 204-207 may be executed in parallel to each other. The target execution time distributor 511 may distribute the target execution time to the first to eighth nodes 201-208 for the sum of the execution times of the first node 201, the second node 202, the third to seventh nodes 203-207, and the eighth node 208 to be 10 ms.

For example, the execution time of 7 ms, 1 ms, 1 ms, and 1 ms may be distributed in proportion to the amount of work of the first node 201, the second node 202, the third to seventh nodes 203-207, and the eighth node 208. When the execution time of 1 ms is distributed to the third to seventh nodes 203-207, the execution time of 1 ms may be distributed to the third node 203 and the fourth to seventh nodes 204-207 executed in parallel to each other. Also, the target execution time of 1 ms may be distributed to the fourth to seventh nodes 204-207 by 0.25 ms in proportion to the amount of work of the fourth to seventh nodes 204-207.

Figure 8:
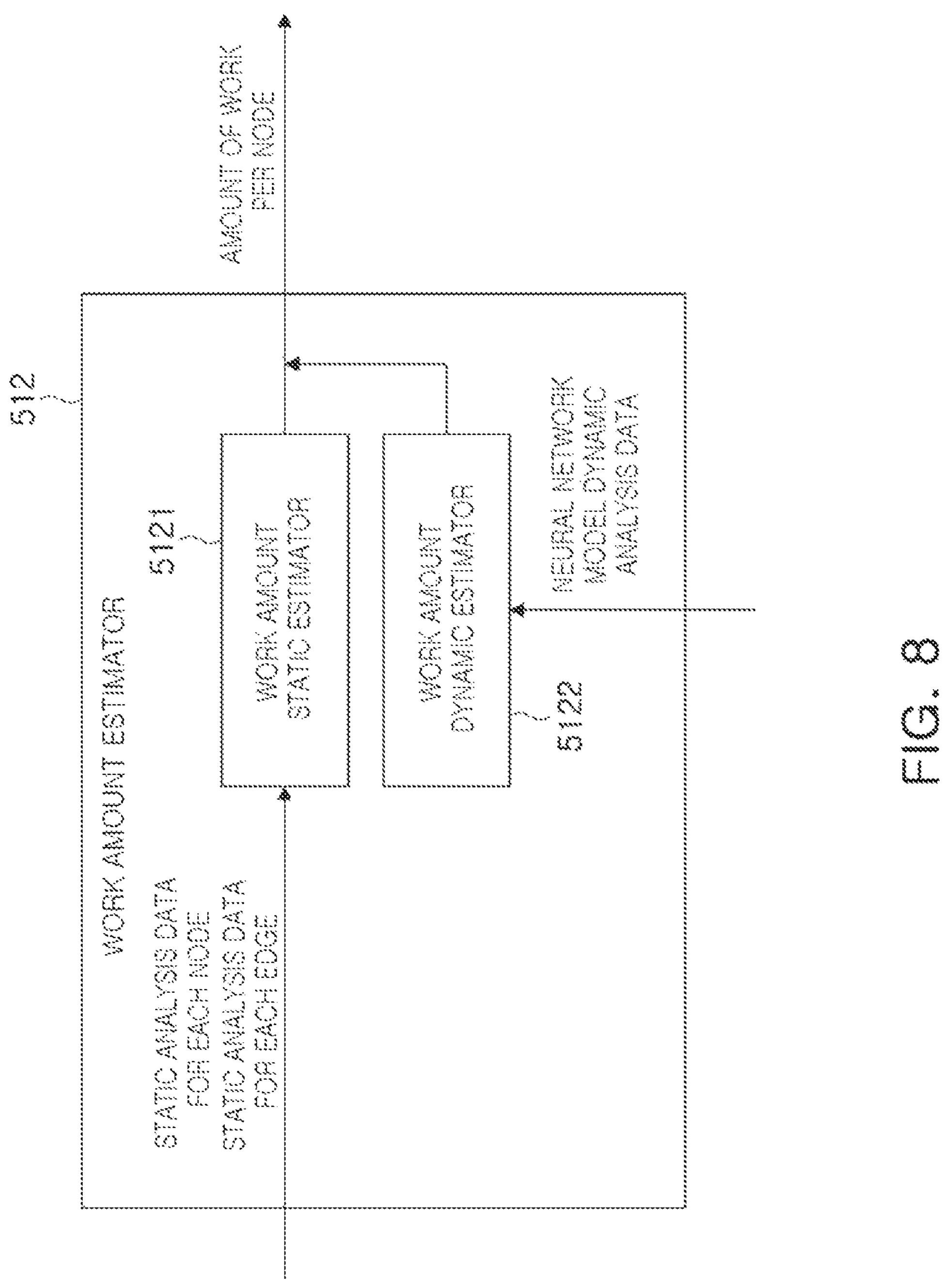
FIG. 8 is a second diagram illustrating software components of the neural network computing system according to an example embodiment of the present disclosure.

FIG. 8 is a diagram illustrating the work amount estimator 512 described with reference to FIG. 6.

The work amount estimator 512 may include a work amount static estimator 5121 and a work amount dynamic estimator 5122. The work amount static estimator 5121 may estimate the amount of work for each node based on the static analysis data, and may be included in the feedforward control portion 301 described with reference to FIG. 4. The work amount dynamic estimator 5122 may adjust the estimated amount of work for each node based on the neural network model dynamic analysis data, and may be included in the feedback control portion 302 described with reference to FIG. 4.

The static analysis data may include static analysis data for each node and static analysis data for each edge. The amount of work of the target computing device for each node may be determined based on the static analysis data for each node, and the amount of memory access may be determined based on the static analysis data for each edge. The amount of work for each node may include the amount of work of the target computing device and the amount of memory access for each node.

The static analysis data for each node may include the pre-measured execution time of the node, the target computing device to be executed by the node, the number of arithmetic instructions of the node, the number of memory instructions of the node, and optimization options of a compiler. The number of arithmetic instructions and the number of memory instructions of a node may be determined by analyzing source code included in the node. The amount of work of the target computing device may be estimated according to an optimization option of the compiler converting the source code into machine language executable by the target computing device.

The static analysis data for each edge may include the pre-measured amount of required memory bandwidth, a size of input data of a node, and a size of output data of a node. The amount of required memory bandwidth may be determined based on the number of memory instructions, a size of input data of a node, and a size of output data. For example, in different nodes having the same size of input data or the same size of output data, as the number of memory instructions of the node increases, the amount of required memory bandwidth may increase. The amount of memory access may be estimated based on the static analysis data for each edge to execute nodes connected to the edge. The amount of memory access may include the amount of work of the memory controller and the amount of work of the system bus.

The amount of work for each node may include the amount of work of the target computing device determined based on the static analysis data for each node, and the amount of work to be performed in the memory controller and the system bus determined based on the static analysis data for each edge.

There may be an error in the amount of work for each node estimated by the work amount static estimator 5121 based on the static analysis data. For example, in the neural network model 200, there may be nodes which may be executed in parallel in the same target computing device according to the connection relationship between the nodes. Accordingly, unexpected overhead may occur based on the static analysis data for each node and the static analysis data for each edge in the target computing device, the memory controller, and the system bus.

The work amount dynamic estimator 5122 may adjust the amount of work for each node based on the neural network model dynamic analysis data. The neural network model dynamic analysis data may include actual end-to-end execution time of the neural network model, the amount of actual memory bandwidth usage of the neural network model, the amount of actual system bus bandwidth usage of the neural network model, the actual execution time for each node, communication overhead between nodes, and the like.

Figure 9:
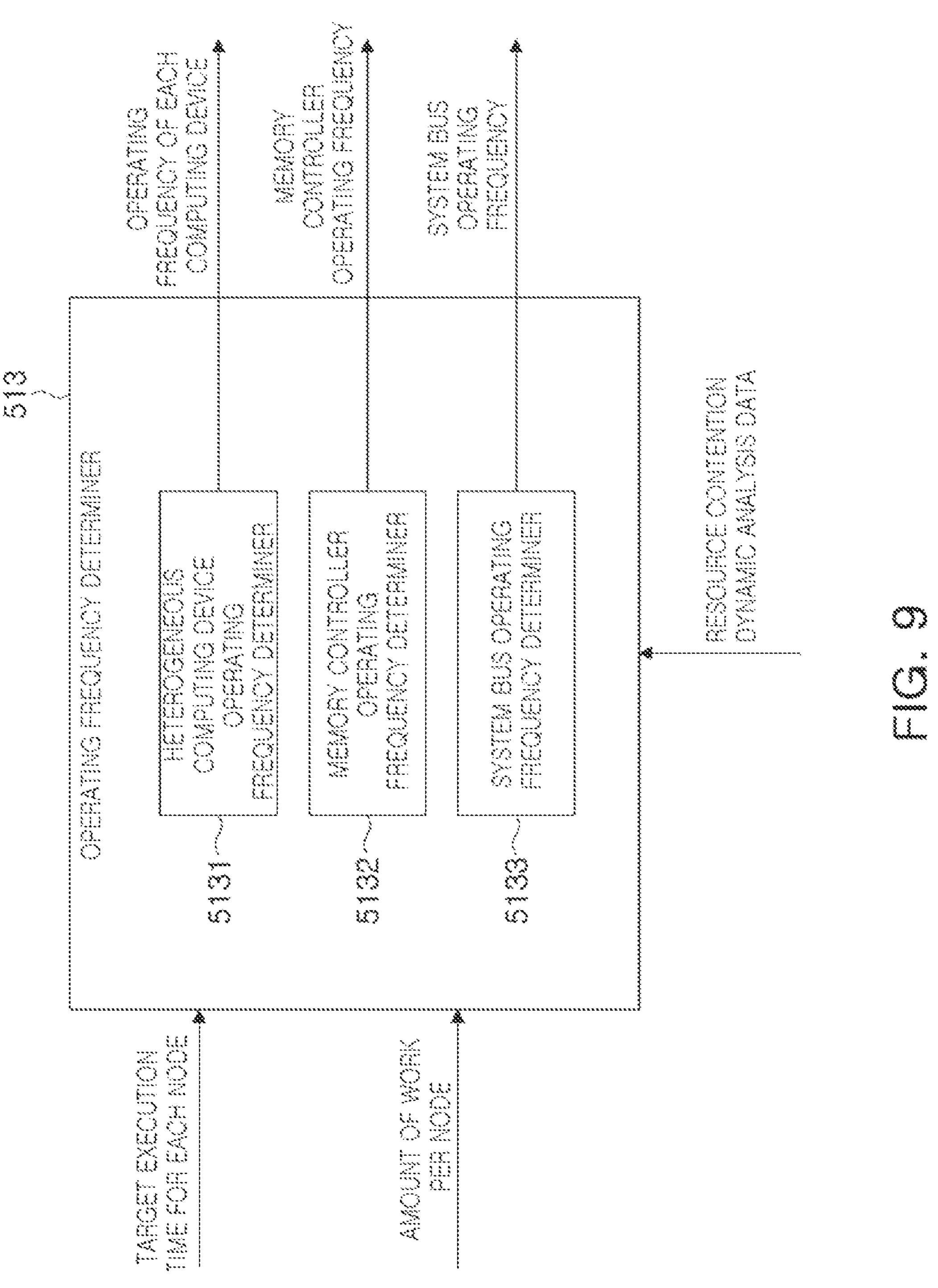
FIG. 9 is a third diagram illustrating software components of the neural network computing system according to an example embodiment of the present disclosure.

FIG. 9 is a diagram illustrating the operating frequency determiner 513 described with reference to FIG. 6.

The operating frequency determiner 513 may include a heterogeneous computing device operating frequency determiner 5131 for determining the operating frequencies of the heterogeneous computing devices, a memory controller operating frequency determiner 5132 for determining the operating frequency of the memory controller, and a system bus operating frequency determiner 5133 for determining the operating frequency of the system bus.

The operating frequency determiner 513 may determine operating frequencies of the hardware devices including the heterogeneous computing devices, the memory controllers, and the system bus based on the target execution time for each node, the amount of work for each node, hardware performance, and resource contention dynamic analysis data.

The operating frequency determiner 513 may determine the amount of work required for each hardware device to perform the neural network model based on the amount of work for each node obtained from the work amount estimator 512. As described above, the amount of work for each node may include the amount of work of the target computing device and the amount of work of the memory controller and the system bus. By decomposing the amount of work of the nodes into the amount of work for each hardware device, and summing the decomposed amount of work for each hardware device, the amount of work for each hardware device may be determined to perform the neural network model.

Also, the operating frequency determiner 513 may determine the target execution time for each hardware device based on the target execution time for each node obtained from the target execution time distributor 511. Also, the operating frequency determiner 513 may determine an optimal operating frequency of each hardware device based on hardware performance, the amount of work for each hardware device, and the target execution time for each hardware device.

The amount of power consumed by the hardware device may be proportional to a square of the operating frequency of the hardware device. That is, the lower the operating frequency of the hardware device, the lower the power consumption of the hardware device may be. Accordingly, the lowest operating frequency among operating frequencies at which each of the hardware devices may perform a predetermined amount of work according to the target execution time may be determined as the optimum operating frequency. When each of the hardware devices operates at the optimal operating frequency, power consumption of the hardware devices may be reduced while complying with the target end-to-end execution time of the neural network model.

The operating frequency determiner 513 may adjust the operating frequencies of the hardware devices determined based on the amount of work for each node, the target execution time for each node, and hardware performance in consideration of resource contention between the hardware devices. Resource contention between hardware devices may stem from relationships with other neural network models or other applications executing simultaneously with a neural network model. The resource contention dynamic analysis data may be obtained by analyzing the result of actually executing the neural network model.

The resource contention dynamic analysis data may indicate the degree of resource contention occurring between hardware devices when the neural network model is executed. The operating frequency determiner 513 may adjust the operating frequency of each hardware device to increase or decrease according to the degree of resource contention.

For example, when the usage rate occupied by the neural network model in the usage rate of a hardware device is relatively low, it may be predicted that resource contention with other applications may occur relatively frequently. When the resource contention occurs frequently, even when the hardware device operates at an operating frequency predicted based on static data of the neural network model, it may be difficult for the neural network model to be executed within a target end-to-end execution time. Therefore, when resource contention occurs frequently, the operating frequency of the hardware device may be adjusted to increase.

Figure 10:
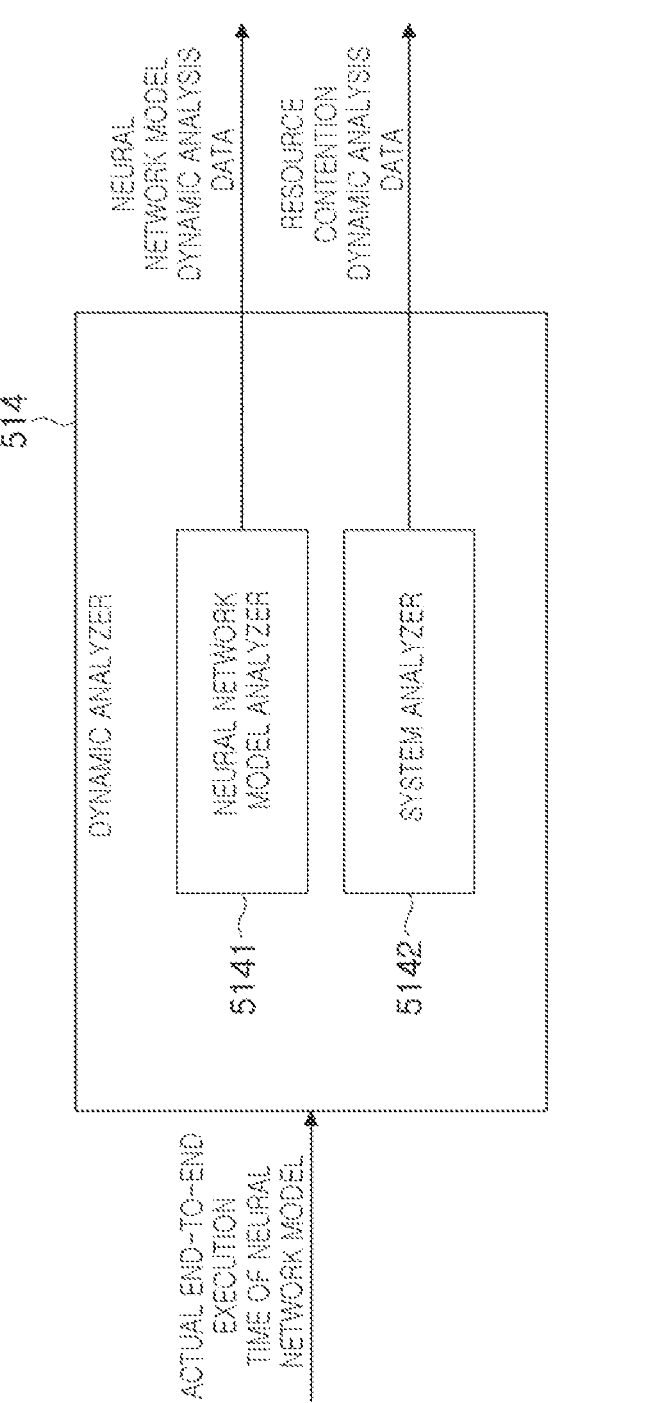
FIG. 10 is a fourth diagram illustrating software components of the neural network computing system according to an example embodiment of the present disclosure.

FIG. 10 is a diagram illustrating the dynamic analyzer 514 described with reference to FIG. 6.

The dynamic analyzer 514 may include a neural network model analyzer 5141 and a system analyzer 5142. The neural network model analyzer 5141 may generate neural network model dynamic analysis data based on the actual end-to-end execution time of the neural network model and dynamic data dependent on the result of execution of the neural network model and may output the data. Similarly, the system analyzer 5142 may generate resource contention dynamic analysis data based on the actual end-to-end execution time and the dynamic data and may output the data. Examples of the neural network model dynamic analysis data have been described with reference to FIG. 8.

The resource contention dynamic analysis data may include dynamic analysis data of resource contention between the heterogeneous computing devices, resource contention between the memory controller, and resource contention between system buses. The dynamic analysis data of resource contention between the heterogeneous computing devices may include a total usage rate of the computing devices, a usage rate occupied by the neural network model in the computing devices, and a delay time of a request queue of the computing devices.

The dynamic analysis data of resource contention between the memory controllers may include the total usage rate of the memory controller, the memory usage rate for each heterogeneous computing device, the number of memory accesses for each heterogeneous computing device, the front/back cache, a cache hit/miss ratio of L1 cache, L2 cache, L3 cache and last level cache (LLC), and the number of outstanding memory requests.

The dynamic analysis data of resource contention between the system buses may include the total usage rate of the system bus, the system bus usage rate for each heterogeneous computing device, and the number of bus accesses for each heterogeneous computing device.

Meanwhile, whenever the neural network model is executed, the neural network model dynamic analysis data and the resource contention dynamic analysis data may be accumulated. The dynamic analyzer 514 may process the accumulated data using an average value computation, a cumulative average computation, a simple moving average computation, a weighted moving average computation, and an exponential moving average computation.

The system software layer of the neural network computing system described with reference to FIGS. 6 to 10 may control the operating frequency of each hardware device when the neural network model is executed by performing open-loop control and closed-loop control. The system software layer may reduce power consumption of the hardware devices while reaching the target end-to-end execution time for each neural network model.

Figure 11:
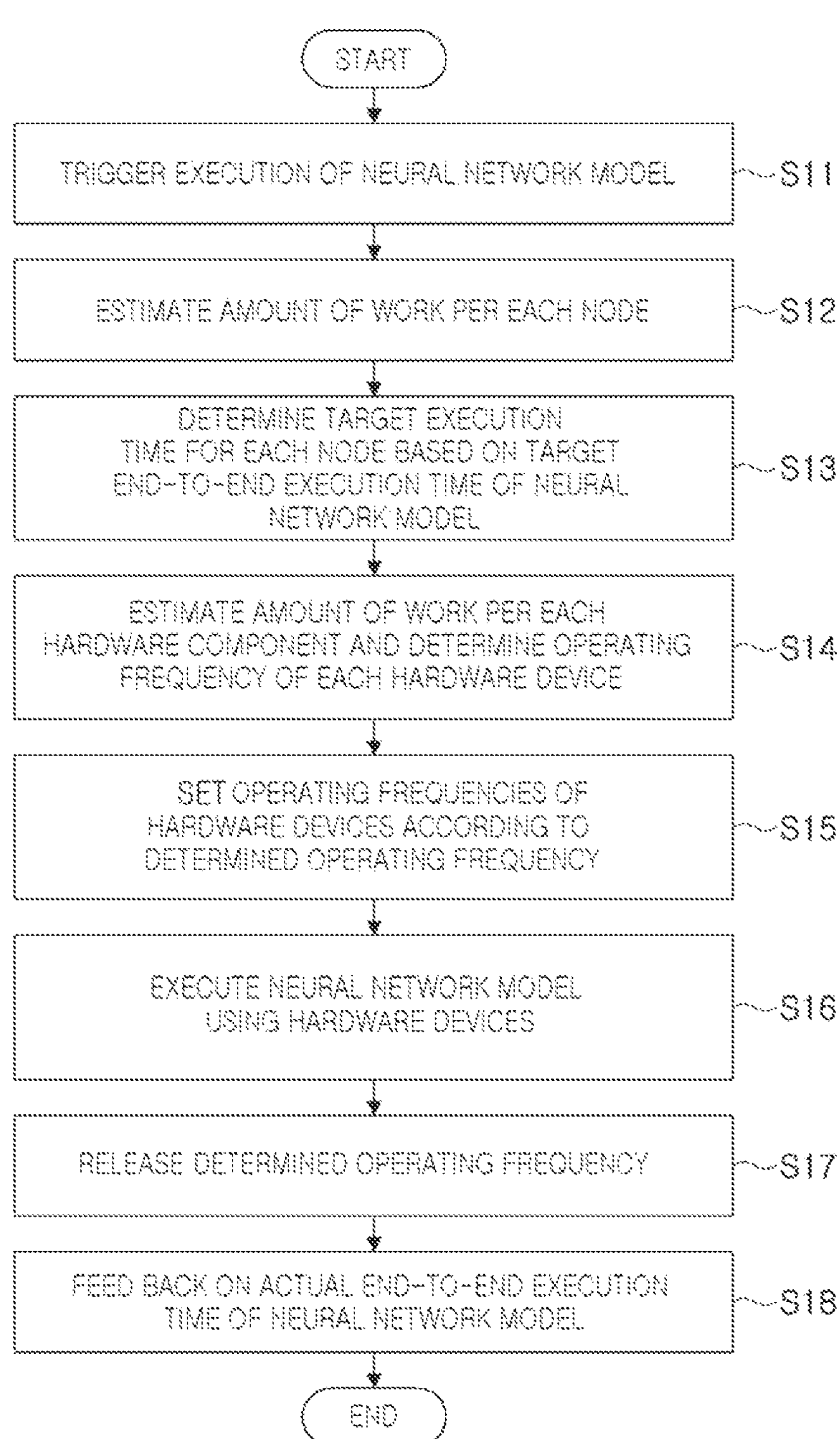
FIG. 11 is a diagram illustrating a method for executing a neural network model according to an example embodiment of the present disclosure.

FIG. 11 is a diagram illustrating a method for executing a neural network model according to an example embodiment.

In operation S11, execution of the neural network model may be triggered. For example, when a camera application is executed by a user selection, execution of a neural network model for sensing an object may be triggered.

In operation S12, the amount of work per node of the neural network model may be estimated. As described with reference to FIG. 8, the amount of work per node may be estimated by analyzing static data such as a source code for each node, and may be adjusted based on the actual result of execution of the neural network model.

In operation S13, the target execution time for each node of the neural network model may be determined. As described with reference to FIG. 7, the target execution time for each node may be determined by distributing the target end-to-end execution time of the neural network model to the nodes based on the connection structure of the nodes and the amount of work for each node.

In operation S14, an amount of work of each hardware component may be estimated and an operating frequency of each hardware device may be determined. As described with reference to FIG. 9, the operating frequency of each hardware device may be determined based on the target execution time for each node, the amount of work for each node, and hardware performance, and may be adjusted based on resource contention dynamic analysis data according to the actual result of execution of the neural network model.

In operation S15, the operating frequency of the hardware devices may be set according to the determined operating frequency.

In operation S16, the neural network model may be executed using hardware devices operating at the determined operating frequencies.

In operation S17, when the execution of the neural network model is completed, the determined operating frequencies may be released. The releasing the determined operating frequencies may include initializing operating frequencies of hardware devices or returning the operating frequencies to operating frequencies before the neural network model is executed. In example embodiments, the neural network model execution portion 520 described with reference to FIG. 6 may release the operating frequencies.

In operation S18, the actual end-to-end execution time of the neural network model may be fed back. The determined operating frequency may be adjusted based on the actual end-to-end execution time of the neural network model. The adjusted operating frequency may be used when the execution of the same neural network model is triggered.

According to an example embodiment, when the execution of the neural network model is triggered, the operating frequency of each hardware device may be controlled by performing open loop control using the target end-to-end execution time of the neural network model and static analysis data. Accordingly, user responsiveness may improve.

According to an example embodiment, the end-to-end target execution time of the neural network model may be decomposed into the target execution time for each node, and the amount of work for each node may be estimated based on the static analysis data. An optimal operating frequency of each hardware device for processing the amount of work for each node within the target execution time for each node may be determined.

According to an example embodiment, an operating frequency of each hardware device may be adjusted by performing closed-loop control based on the result of execution of the neural network model. To process the neural network model, each of the hardware devices may operate at an optimal operating frequency, such that power consumption may be reduced and the target end-to-end execution time of the neural network model may be complied with.

Figure 12:
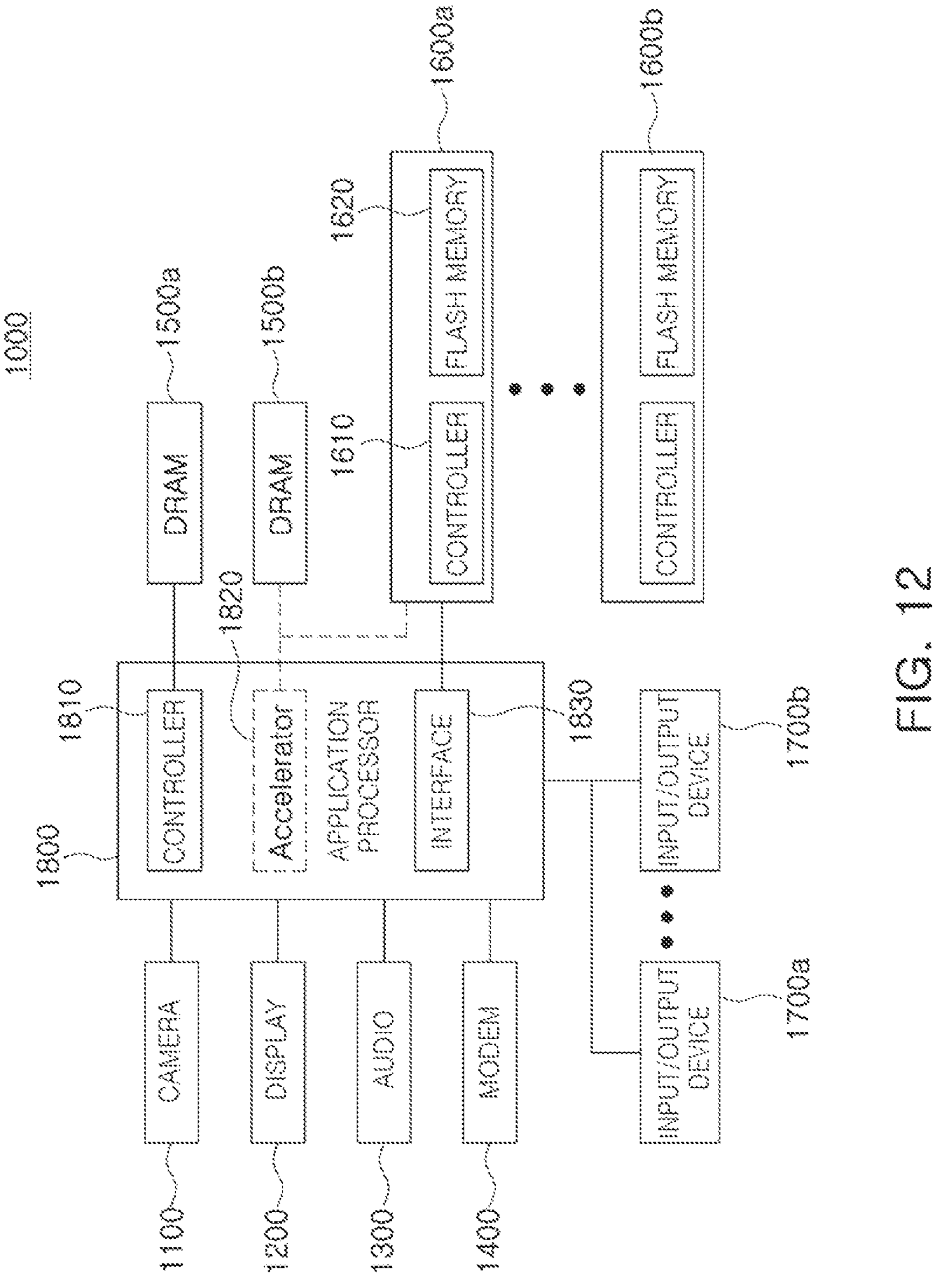
FIG. 12 is a diagram illustrating an electronic device to which a neural network computing system is applied according to an example embodiment of the present disclosure.

FIG. 12 is a diagram illustrating an electronic device to which a neural network computing system is applied according to an example embodiment.

Referring to FIG. 12, the mobile system 1000 may include a camera 1100, a display 1200, an audio processing unit 1300, a modem 1400, DRAMs 1500*a* and 1500*b*, and flash memory devices 1600*a* and 1600*b*, input/output (I/O) devices 1700*a* and 1700*b*, and an application processor (AP) 1800.

The mobile system 1000 may be implemented as a laptop computer, a portable terminal, a smart phone, a tablet PC, a wearable device, a healthcare device, or an Internet-of-Things (IoT) device. Also, the mobile system 1000 may be implemented as a server or a personal computer.

The camera 1100 may obtain a still image or a video according to user control. The mobile system 1000 may obtain specific information using a still image/video obtained by the camera 1100 or may convert still image/video into other types of data such as text and may store the data. Alternatively, the mobile system 1000 may recognize a character string included in a still image/video obtained by the camera 1100 and may provide a text or audio translation corresponding to the character string. As such, the field of application of the camera 1100 in the mobile system 1000 may be diverse. In an example embodiment, the camera 1100 may transmit data such as a still image/video to the AP 1800 according to a D-Phy or C-Phy interface according to the Mobile Industry Processor Interface (MIPI) standard.

The display 1200 may be implemented as various forms of displays such as liquid crystal display (LCD), organic light emitting diodes display (OLED), active-matrix organic light-emitting diode (AM-OLED), plasma display panel (PDP), field emission display (FED), or E-paper. In an example embodiment, the display 1200 may be used as an input device of the mobile system 1000 by providing a touch screen function. Also, the display 1200 may be provided integrally with a fingerprint sensor and may provide a security function of the mobile system 1000. In an example embodiment, the AP 1800 may transmit image data to be displayed on the display 1200 to the display 1200 according to the D-Phy or C-Phy interface according to the MIPI standard.

The audio processing unit 1300 may process audio data stored in the flash memory devices 1600*a* and 1600*b* or audio data included in the contents received from an external entity through the modem 1400 or the I/O devices 1700*a* and 1700*b*. For example, the audio processing unit 1300 may perform various processes such as coding/decoding, amplification, and noise filtering on audio data.

The modem 1400 may modulate and transmit a signal for transmission and reception of wired/wireless data, and may restore the original signal by demodulating a signal received from an external entity. The I/O devices 1700*a* and 1700*b* may be configured to provide digital input and output, and may include a port connected to an external recording medium, an input device such as a touch screen or a mechanical button key, an output device for outputting vibrations in a haptic manner, and the like. In example examples, the I/O devices 1700*a* and 1700*b* may be connected to an external recording medium through a port such as a USB, a lightning cable, an SD card, a micro SD card, a DVD, a network adapter, and the like.

The AP 1800 may control overall operations of the mobile system 1000. Specifically, the AP 1800 may control the display 1200 such that a portion of the content stored in the flash memory devices 1600*a* and 1600*b* may be displayed on the screen. Also, when a user input is received through the I/O devices 1700*a* and 1700*b*, the AP 1800 may perform a control operation corresponding to the user input.

The AP 1800 may be provided as a system-on-chip (SoC) for driving an application program, an operating system (OS), and the like. Also, the AP 1800 may be included in a semiconductor package together with other devices included in the mobile system 1000, such as, for example, the DRAM 1500*a*, the flash memory 1620, and/or a memory controller 1610. For example, at least one device different from the AP 1800 may be provided in a package form such as package on package (PoP), ball grid arrays (BGAs), chip scale packages (CSPs), system in package (SIP), multichip package (MCP), wafer-level fabricated package (WFP), or wafer-level processed stack package (WSP). The kernel of the operating system running on the AP 1800 may include an I/O scheduler and a device driver for controlling the flash memory devices 1600*a* and 1600*b*. The device driver may control access performance of the flash memory devices 1600*a* and 1600*b* by referring to the number of synchronous queues managed by the I/O scheduler, or may control the CPU mode and dynamic voltage and frequency scaling (DVFS) level in the SoC.

In an example embodiment, the AP 1800 may include a processor block for executing a computation or driving an application program and/or an operating system, and various other peripheral components connected to the processor block through a system bus. The peripheral components may include a memory controller, an internal memory, a power management block, an error detection block, a monitoring block, and the like. The processor block may include one or more cores. When the processor block includes a plurality of cores, each of the cores may include a cache memory, and a common cache shared by the cores may be included in the processor block.

In an example embodiment, the AP 1800 may include an accelerator block 1820 which is a dedicated circuit for AI data computation. Alternatively, in example embodiments, a separate accelerator chip may be provided separately from the AP 1800, and a DRAM 1500*b* may be additionally connected to the accelerator block 1820 or the accelerator chip. The accelerator block 1820 may be a function block which may professionally perform a specific function of the AP 1800, and may include a graphics processing unit (GPU), which is a function block for professionally performing processing of graphics data, a neural processing unit (NPU), which is a block for professional performing artificial intelligence (AI) calculation and inference, and a data processing unit (DPU), which is a block specialized in data transmission.

In example embodiments, the mobile system 1000 may include a plurality of DRAMs 1500*a* and 1500*b*. In an example embodiment, the AP 1800 may include a controller 1810 for controlling the DRAMs 1500*a* and 1500*b*, and the DRAM 1500*a* may be directly connected to the AP 1800.

The AP 1800 may control the DRAMs 1500*a* and 1500*b* by setting a command and a mode register set (MRS) conforming to the Joint Electron Device Engineering Council (JEDEC) standard, or may communicate by setting specifications and functions required by the mobile system 1000 such as low voltage/high speed/reliability and DRAM interface protocol for Cyclical Redundancy Check (CRC)/Error Checking and Correction (ECC). For example, the AP 1800 may communicate with the DRAM 1500*a* through an interface conforming to JEDEC standards such as LPDDR4 and LPDDR5. Alternatively, for the accelerator chip provided separately from the accelerator block 1820 or the AP 1800 to control the DRAM 1500*b* for an accelerator having a bandwidth higher than that of the DRAM 1500*a*, the AP 1800 may establish a new DRAM interface protocol to communicate.

In FIG. 12, only the DRAMs 1500*a* and 1500*b* are illustrated, but the configuration of the mobile system 1000 is not necessarily limited to such a form, and a memory other than the DRAMs 1500*a* and 1500*b* may be included in the mobile system 1000 according to the bandwidth, response speed, and voltage conditions of the AP 1800 or the accelerator block 1820. For example, the controller 1810 and/or the accelerator block 1820 may control various memories such as phase-change random access memory (PRAM), static random access memory (SRAM), magnetoresistive random access memory (MRAM), resistive random access memory (RRAM), ferroelectric random access memory (FRAM), and Hybrid RAM. The DRAMs 1500*a* and 1500*b* may have relatively lower latency and higher bandwidth than those of the I/O devices 1700*a* and 1700*b* or the flash memory devices 1600*a* and 1600*b*. The DRAMs 1500*a* and 1500*b* may be initialized when the mobile system 1000 is powered on, and when the operating system and application data are loaded, the DRAMs 1500*a* and 1500*b* may be used as temporary storage spaces for the operating system and application data or may be used as execution spaces for various software code.

In the DRAMs 1500*a* and 1500*b*, addition/subtraction/multiplication/division arithmetic operations, vector operations, address operations, or fast Fourier transform (FFT) operation data may be stored. In another example embodiment, the DRAMs 1500*a* and 1500*b* may be provided as a processing in memory (PIM) equipped with an arithmetic function. For example, a function for execution used for inference may be performed in the DRAMs 1500*a* and 1500*b*. Here, the inference may be performed in a deep learning algorithm using an artificial neural network. The deep learning algorithm may include a training operation of learning a model through various data and an inference operation of recognizing data with the learned model. For example, the function used for inference may include a hyperbolic tangent function, a sigmoid function, a rectified linear unit (ReLU) function, and the like.

As an example embodiment, an image obtained by the user through the camera 1100 may be signal-processed and may be stored in the DRAM 1500*b*, and the accelerator block 1820 or the accelerator chip may perform an AI data computation for recognizing data using data stored in the DRAM 1500*b* and a function used for inference.

In example embodiments, the mobile system 1000 may include a plurality of storage or a plurality of flash memory devices 1600*a* and 1600*b* having capacity larger than that of the DRAMs 1500*a* and 1500*b*. The flash memory devices 1600*a* and 1600*b* may include a memory controller 1610 and a flash memory 1620. The memory controller 1610 may receive a control command and data from the AP 1800, and may write data to the flash memory 1620 in response to the control command or may read data stored in the flash memory 1620 and may transmit the data to the AP 1800.

In example embodiments, the accelerator block 1820 or the accelerator chip may perform a training operation and AI data operation using the flash memory devices 1600*a* and 1600*b*. In an example embodiment, in the flash memory device 1600*a* and 1600*b*, a block for executing a predetermined computation may be implemented, and the block may instead execute at least a portion of the training operation and the inference AI data operation performed by the AP 1800 and/or the accelerator block 1820 using data stored in the flash memory 1620.

In an example embodiment, the AP 1800 may include an interface 1830, and accordingly, the flash memory devices 1600*a* and 1600*b* may be directly connected to the AP 1800. For example, the AP 1800 may be implemented as an SoC, the flash memory device 1600*a* may be implemented as a chip different from the AP 1800, and the AP 1800 and the flash memory device 1600_a_ may be mounted in a package. However, example embodiments of the present disclosure are not limited thereto, and the plurality of flash memory devices 1600_a_ and 1600_b_ may be electrically connected to the mobile system 1000 through various connections.

The flash memory devices 1600_a_ and 1600_b_ may store data such as still images/videos obtained by the camera 1100, or may store data received through a communication network and/or a port included in the I/O devices 1700_a_ and 1700_b_. For example, augmented reality/virtual reality, high definition (HD), or ultrahigh definition (UHD) content may be stored.

In an example embodiment, the AP 1800 may drive a camera application which allows the user to use the camera 1100 by abstracting the camera 1100. The AP 1800 may drive a neural network model which may sense an object in an image frame generated by the camera application and a neural network model which may determine what the object is while the camera application is executed.

In an example embodiment, the AP 1800 may control the operating frequency of each of the hardware devices based on the target end-to-end execution time for each neural network model with respect to each of the various neural network models. Accordingly, the mobile system 1000 may comply with the target end-to-end execution time for each neural network model and may reduce power consumption.

According to the aforementioned example embodiments, the neural network computing system may determine the target execution time for each node of the neural network model based on the target end-to-end execution time of the neural network model, and may individually control the operating frequencies of the hardware devices based on the target execution time for each node, thereby reducing power consumption of the hardware devices.

Also, the neural network computing system may control operating frequencies of the hardware devices by performing open-loop control prior to execution of the neural network model. Accordingly, the target end-to-end execution time of the neural network model may be complied with even before receiving feedback on the actual end-to-end execution time of the neural network model to perform closed-loop control. Accordingly, user responsiveness may improve.

While the example embodiments have been illustrated and described above, it will be understood by those skilled in the art that modifications and variations may be made without departing from the scope of the present disclosure.

What is claimed is:

1. A neural network computing system, comprising:

a processor comprising heterogeneous computing devices configured to execute a neural network model;

a memory configured to buffer input data and output data of the neural network model;

a memory controller configured to control data input and data output of the memory; and a system bus configured to support communication between the processor and the memory controller, wherein the processor is configured to:

determine a target execution time for each node among a plurality of nodes comprised in the neural network model based on a target end-to-end execution time of the neural network model;

control respective operating clock frequencies of hardware devices, including the heterogeneous computing devices, the memory controller, and the system bus, based on a target computing device for execution of each node, an amount of work for each node, and the target execution time for each node; and execute the neural network model by the hardware devices operating at the controlled respective operating clock frequencies, and wherein the respective operating clock frequencies of the hardware devices are lowest operating clock frequencies of the hardware devices, respectively, at which the hardware devices perform a predetermined amount of work according to the target end-to-end execution time.

2. The neural network computing system of claim 1, wherein the processor is further configured to:

adjust the amount of work for each node and the target execution time for each node based on an actual end-to-end execution time of the neural network model; and adjust an operating clock frequency of each of the hardware devices based on the adjusted amount of work for each node and the adjusted target execution time for each node.

3. The neural network computing system of claim 1, wherein the processor is further configured to:

determine an execution order of the plurality of nodes and whether to execute the plurality of nodes in parallel based on a connection relationship between the plurality of nodes and a plurality of edges included in the neural network model; and determine the target execution time for each node by distributing the target end-to-end execution time of the neural network model to nodes, which are executed in sequence with respect to each other, in proportion to the amount of work for each node.

4. The neural network computing system of claim 1, wherein the processor is further configured to determine the amount of work for each node based on a number of arithmetic instructions of each node, a number of memory instructions of each node, a compiler option for each node, an amount of required memory bandwidth of each node, a size of input data for each node, and a size of output data for each node.

5. The neural network computing system of claim 4, wherein the processor is further configured to determine the number of arithmetic instructions and the number of memory instructions of each node by analyzing source code included in each node.

6. The neural network computing system of claim 4, wherein the processor is further configured to determine the amount of required memory bandwidth of each node based on the number of memory instructions, the size of the input data for each node, and the size of the output data for each node.

7. The neural network computing system of claim 4, wherein the amount of work for each node comprises the number of arithmetic instructions of each node, the number of memory instructions of each node, an amount of work of the target computing device for each node determined based on the compiler option, an amount of memory access for each node determined based on the amount of required memory bandwidth of each node, the size of the input data for each node, and the size of the output data for each node.

8. The neural network computing system of claim 7, wherein the processor is further configured to:

determine an amount of work of the heterogeneous computing devices required to execute the neural network model based on the amount of work of the target computing device for each node; and determine an amount of work of the memory controller and an amount of work of the system bus required to execute the neural network model based on the amount of memory access for each node.

9. The neural network computing system of claim 8, wherein the processor is further configured to:

determine a minimum operating clock frequency at which the target execution time for each node is complied with from among a plurality of operating clock frequencies for each of the hardware devices based on a performance of each of the hardware devices and an amount of work for each of the hardware devices; and control the respective operating clock frequencies of the hardware devices based on the determined minimum operating clock frequency of each of the hardware devices.

10. The neural network computing system of claim 1, wherein the heterogeneous computing devices comprise a central processing unit (CPU), a neural processing unit (NPU), a graphics processing unit (GPU), a digital signal processor (DSP), and an accelerator.

11. The neural network computing system of claim 1, wherein the processor is further configured to receive the target end-to-end execution time of the neural network model as an input through an application programming interface (API).

12. A neural network computing system comprising:

a processor comprising heterogeneous computing devices that are configured to execute a neural network model;

a memory configured to buffer input data and output data of the neural network model;

a memory controller configured to control data input and data output of the memory; and a system bus configured to support communication between the processor and the memory controller, wherein the processor comprises:

a feedforward control portion configured to:

estimate, based on an input of static analysis data that is independent of a result of execution of the neural network model, an amount of work of each node from among a plurality of nodes included in the neural network model; and determine respective operating clock frequencies of hardware devices, including the heterogeneous computing devices, the system bus, and the memory controller, based on an input of a target end-to-end execution time of the neural network model and an input of the estimated amount of work of each node from among the plurality of nodes;

a neural network model execution portion configured to control the hardware devices according to the determined respective operating clock frequencies, execute the neural network model, and output an actual end-to-end execution time of the neural network model; and a feedback control portion configured to adjust the respective operating clock frequencies of the hardware devices based on dynamic analysis data dependent on the result of the execution of the neural network model, including the actual end-to-end execution time, and wherein the respective operating clock frequencies of the hardware devices are lowest operating clock frequencies of the hardware devices, respectively, at which the hardware devices perform a predetermined amount of work according to the target end-to-end execution time.

13. The neural network computing system of claim 12, wherein the feedback control portion is further configured to:

determine a degree of resource contention with an application simultaneously executed with the neural network model by analyzing a usage rate of each of the hardware devices while the neural network model is executed; and adjust the respective operating clock frequencies of the hardware devices based on the degree of resource contention.

14. The neural network computing system of claim 13, wherein the feedback control portion is further configured to adjust the respective operating clock frequencies of the hardware devices to increase based on a usage rate occupied by the neural network model among usage rates of the hardware devices decreases.

15. The neural network computing system of claim 13, wherein the neural network computing system further comprises a camera, wherein the application is a camera application generating an image frame using the camera, and wherein the neural network model comprises at least one of a model for sensing an object in the image frame, and a model for identifying what the object is.

16. The neural network computing system of claim 12, wherein the feedback control portion is further configured to:

accumulate analysis data generated when the neural network model is repeatedly executed; and generate the dynamic analysis data by processing the accumulated analysis data using one from among an average operation, an accumulative average operation, a simple moving average operation, a weighted moving average operation, and an exponential moving average operation of the accumulated analysis data.

17. The neural network computing system of claim 12, wherein the feedforward control portion is further configured to:

estimate an amount of work of a target computing device for execution of each node, among the plurality of nodes, and an amount of memory access for each node using the static analysis data;

determine a target execution time for each node based on the target end-to-end execution time of the neural network model;

estimate an amount of work of the heterogeneous computing devices based on the amount of work of the target computing device for each node;

estimate an amount of work of the memory controller and an amount of work of the system bus based on the amount of memory access for each node; and determine an operating clock frequency of each of the hardware devices based on a performance of each of the hardware devices, the amount of work of the heterogeneous computing devices, the amount of work of the memory controller, and the amount of work of the system bus.

18. The neural network computing system of claim 17, wherein the feedforward control portion is further configured to determine an operating clock frequency, as the operating clock frequency of each of the hardware devices, at which the target execution time for each node is complied with and power consumption is minimized from among operating clock frequencies of the hardware devices.

19. The neural network computing system of claim 12, wherein the neural network model execution portion is further configured to release the operating clock frequencies of the hardware devices when execution of the neural network model is completed.

20. A method of executing a neural network model, the method comprising:

estimating an amount of work for each node among a plurality of nodes included in the neural network model based on execution of the neural network model being triggered;

determining a target execution time for each node of the plurality of nodes based on a target end-to-end execution time of the neural network model;

controlling an operating clock frequency of each of a plurality of heterogeneous computing devices for executing the neural network model, based on a target computing device for each node, the amount of work for each node, and the target execution time for each node;

executing the neural network model using the plurality of heterogeneous computing devices operating according to the controlled operating clock frequency of each of the plurality of heterogeneous computing devices; and adjusting the operating clock frequency of each of the plurality of heterogeneous computing devices for executing the neural network model based on an actual end-to-end execution time of the neural network model, wherein the operating clock frequency is a lowest operating clock frequency of a respective one of the plurality of heterogeneous computing devices at which the respective one of the plurality of heterogeneous computing devices performs a predetermined amount of work according to the target end-to-end execution time.

* * * * *